Patented May 5, 1953

2,637,729

UNITED STATES PATENT OFFICE 2,637,729

POLYMETHINE DYES

John David Kendall and Douglas James Fry, Ilford, England, assignors to Ilford Limited, Ilford, England, a British company No Drawing. Application March 5, 1951, Serial No. 214,016. In Great Britain March 14, 1950

5 Claims. (Cl. 260—240.65)

This invention relates to polymethine dyestuffs and particularly to cyanine dyestuffs which contain alkylamino or arylamino substituents in the polymethine chain.

According to the present invention valuable new cyanine dyes are provided having the general Formula I:

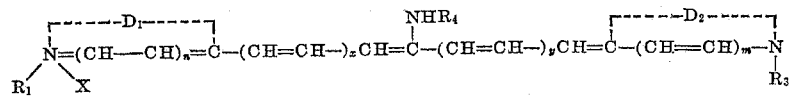

where $R_1$ and $R_3$ are the same or different and each represents an alkyl, hydroxyalkyl or aralkyl group, $R_4$ represents an alkyl, cycloalkyl, aralkyl or aryl group, $D_1$ and $D_2$ are the same or different and each represents the residue of a five-membered or six-membered heterocyclic ring system of the type known for use in cyanine dyes, X represents an acid radicle, and $n$, $m$, $x$ and $y$ are the same or different and each represents nought or one.

Preferably $R_1$ and $R_3$ represent lower alkyl groups, e. g. methyl, alkyl, propyl or butyl, or corresponding hydroxyalkyl groups, and $R_2$ represents an aryl group, e. g. benzene or toluene.

$D_1$ and $D_2$ may each be the residue of any of the types of heterocyclic nuclei comonly employed in photographic sensitising dyes, e. g. thiazoles, oxazoles, selenazoles and their polycyclic homologues such as those of the benzene, naphthalene, acenaphthene and anthracene series; pyridine and its polycyclic homologues such as quinoline and $a$ and $\beta$ naphthaquinolines; lepidines; indolenines; diazines such as pyrimidines and quinazolines; diazoles (e. g. thio-$\beta\beta'$-diazole); oxazolines, thiazolines and selenazolines. The polycyclic compounds of these series may be substituted in the carbocyclic rings by one or more groups such as alkyl, aryl, amino, hydroxy, alkoxy and methylenedioxy groups or by halogen atoms.

Preferably, according to this invention $D_1$ and $D_2$ are selected from benzthiazole, benzoxazole, quinoline and indolenine residues.

The acid radicle X may be, for example, a halide radicle (chloride, bromide or iodide), alkyl sulphate or p-toluene sulphonate.

According to a further aspect of this invention there is provided a method of preparing the aforesaid dyes which comprises heating a compound of the general Formula II:

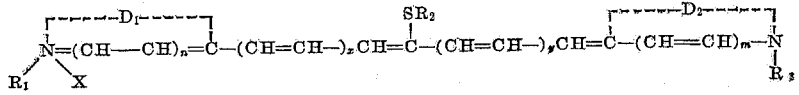

where $R_1$, $R_3$, $D_1$, $D_2$, $n$, $m$, $x$, and $y$ have the meanings assigned to them above and $R_2$ is an alkyl, aryl or aralkyl group, with a primary amine of the formula $R_4NH_2$ where $R_4$ has the meaning assigned to it above.

The temperature may vary widely, but for optimum yield a temperature between 80 and 160° is preferred, depending on the particular amine employed. In the case of the arylamines the aryl group may contain substituents, and it has been found that substituents which are electron-repelling groups, such as methyl and ethoxy, tend to accelerate the reaction, while substituents which are electron-attracting groups, such as halogen atoms, tend to retard the reaction.

When the reaction is slow there is a tendency to the formation of a small quantity of the corresponding thioketone as a secondary product. The dyestuff required according to the present invention can be separated from such secondary product by fractional crystallisation, the thioketone being sparingly soluble, or by extraction of the reaction mixture with ether or benzene in which the thioketone is soluble but the required dye only sparingly soluble.

The dyestuffs of general Formula I are sensitisers for photographic silver halide emulsions and some of them are exceptionally powerful sensitisers. Although themselves less highly coloured than the thioalkyl cyanines from which they are derived, they nevertheless sensitise over approximately the same region of the spectrum. It may be noted that while the presence of alkoxy groups in an arylamine reactant accelerates the reaction to produce the dye, the resulting dyes are generally less powerful sensitisers than those obtained from the simple arylamines such as aniline and p-toluidine.

The dyestuffs of general Formula I may be introduced into gelatino silver halide emulsions and particularly gelatino silver iodobromide emulsions in sensitising amounts by the techniques usually used in dye-sensitising such emulsions.

The following examples will serve to illustrate the invention, but are not to be regarded as limiting it in any way:

EXAMPLE 1

3:3'-dimethyl-9-anilinothiacarbocyanine bromide

3:3' - dimethyl-9-methylthio-thiacarbocyanine bromide (1.0 g.) was heated with aniline (5 cc.) at 150° for 1½ hours. The initial deep blue colour faded to an orange-pink colour. The mixture was cooled, diluted with ether and the precipitate filtered off. Ether-soluble impurities were removed by extraction in a Soxhlet extractor with ether. The ether-insoluble residue (0.6 g.) was crystallised twice from methyl alcohol and was then obtained as small dark-red crystals, M. Pt. 285° C. (decomp.). Found: S, 12.65. $C_{25}H_{22}S_2N_3Br$ requires S, 12.6%). Incorporated in a silver iodobromide emulsion it gave a zone of sensitivity extending to 6500 Å. with a maximum at 6050 Å.

EXAMPLE 2

3:3'-dimethyl-9-(4-methylphenylamino) oxacarbocyanine iodide

3:3' - dimethyl-9-methylthio-oxacarbocyanine iodide (2.5 g.) was heated on a water bath for 3 hours with p-toluidine (25 g.). The pale yellow solution was diluted with ether and the precipitated product collected. It crystallised from methanol as small yellow crystals, M. Pt. 246–248° C.

EXAMPLE 3

3:3'-dimethyl - 9 - (4-methylphenylamino) oxathiacarbocyanine iodide

3:3' - dimethyl-9-methylthio-oxathiacarbocyanine iodide (2.5 g.) was heated on a water bath for 8 hours with p-toluidine (25 g.). The orange-yellow reaction mixture was diluted with ether and the precipitated product crystallised from ethanol when it was obtained as small orange crystals, M. Pt. 210° C.

EXAMPLE 4

3:3-dimethyl-5:6:5':6'-bis (methylenedioxy) - 9- 4-(methyl-phenylamino) thiacarbocyanine iodide 3:3'-dimethyl-5:6:5':6'-bis (methylenedioxy)-9-methylthiothiacarbocyanine iodide (2.5 g.) was heated for 8 hours at 140° C. with p-toluidine (25 g.). The purple reaction mixture was diluted with ether and the precipitated product collected. When crystallised from ethanol it was obtained as small deep purple crystals, M. Pt. 217–219° C.

EXAMPLE 5

3:3'-dimethyl-5'-chlor-9-(4-methyl phenylamino) oxathiacarbocyanine iodide

3:3' - dimethyl-5'-chlor-9-methylthio-oxathiacarbocyanine iodide (3.5 g.) was heated on a water bath for 4 hours with p-toluidine (35 g.). The orange solution was diluted with ethanol (100 cc.) and filtered from a little impurity. The filtrate was diluted with ether and the precipitated product recrystallized from ethanol to give shining golden-yellow plates, M. Pt. 205° C.

EXAMPLE 6

3-methyl-3'-ethyl-9-anilinothiacarbocyanine iodide 3-methyl-3'-ethyl-9-ethylthiothiacarbocyanine iodide (2.5 g.) was heated on a water bath for 24 hours with aniline (25 cc.). The pinkish-orange reaction mixture was diluted with ether and the precipitated product filtered off. After recrystallisation from ethanol it was obtained as small crimson crystals with a green reflex. Incorporated into a gelatino-silver iodobromide emulsion it extended the sensitivity to 6200 Å. with a maximum at 5900 Å. The same product was obtained when 3-methyl-3'-ethyl-9-phenylthio-thiacarbocyanine iodide (2.5 g.) was heated for 24 hours at 95° C. with aniline (20 cc.).

EXAMPLE 7

3-methyl-3'-ethyl-9(4-ethoxyphenylamino)-thiacarbocyanine iodine

3 - methyl - 3' - ethyl - 9-ethylthiocarbocyanine iodide (5 g.) was heated on a water bath for 2 hours with p-phenetidine (50 cc.). The orange solution was diluted with ether and the precipitated solid recrystallised from ethanol when it was obtained as small brick-red crystals, M. Pt. 234–236° C. It extended the sensitivity of a gelatino-silver iodobromide emulsion to 6000 Å. with maxima at 5200 Å. and 5800 Å.

EXAMPLE 8

3-methyl-3'-ethyl-9-(4-methylphenylamino)-thiacarbocyanine iodide 3-methyl-3'-ethyl-9-ethylthiothiacarbocyanine iodide (5 g.) was heated on a water bath with p-toluidine (50 g.) for 9 hours. The pinkish-orange reaction mixture was diluted with ether and the precipitated dye purified by recrystallization from ethanol, from which it separated as brick-red plates with a green reflex, M. Pt. 251–253° C. Incorporated in a gelatino-silver iodobromide emulsion the dye extended the sensitivity to 6200 Å. with a maximum at 5900 Å.

EXAMPLE 9

3:3'-diethyl-9-anilinothiacarbocyanine iodide

3:3' - diethyl - 9 - ethylthio - thiacarbocyanine iodide (5 g.) was heated on a water bath for 25 hours with aniline (50 cc.). The pinkish-orange solution was diluted with ether and the precipitated solid collected. It was extracted in a Soxhlet extractor with ether to remove ether-soluble impurities (mainly the thioketone). The ether-insoluble residue was crystallised from methanol to give minute dark red crystals, M. Pt. 184–186°. Incorporated in a gelatino-silver iodobromide emulsion the dye extended the sensitivity to 6200 Å. with a maximum at 5900 Å.

EXAMPLE 10

3:3'-diethyl-9-(4-ethoxyphenylamino) thiacarbocyanine iodide

3:3' - diethyl - 9 - ethylthio - thiacarbocyanine iodine (5 g.) was heated on the water bath for 2½ hours with p-phenetidine (50 cc.). The orange solution was diluted with ether and the precipitated dye recrystallised from ethanol to give small brick-red crystals, M. Pt. 245° C. Incorporated in a gelatino-silver iodobromide emulsion the dye extended the sensitivity to 6000 Å. with maxima at 5200 Å. and 5800 Å.

EXAMPLE 11

3:3' - diethyl - 9 - (4-methoxyphenylamino) thiacarbocyanine iodide

The procedure of Example 10 was repeated using p-anisidine (50 cc.) in place of p-phenetidine. The dye was isolated and purified as in that example, M. Pt. 230–231° (with decomposition). The sensitising action was similar to the dye obtained in Example 10.

EXAMPLE 12

*3-methyl-3'-ethyl-9-(2-methoxyphenylamino)-thiacarbocyanine iodide*

3 - methyl-3'-ethyl-9-ethylthio-thiacarbocyanine iodide (2.5 g.) was heated for 63 hours at 100° with o-anisidine (25 cc.). The reaction mixture was diluted with ether and the precipitated product purified by dissolution in methanol and reprecipitation with ether, when it separated as deep red crystals, M. Pt. 175° C. Incorporated in a gelatino-silver iodobromide emulsion it extended the sensitivity to 6100 Å. with a maximum at 5900 Å.

EXAMPLE 13

*3-methyl-3'-ethyl-9-(4-chlorphenylamino)-thiacarbocyanine iodide*

3-methyl-3'-ethyl-9-ethylthiothiacarbocyanine iodide (2.5 g.) was heated at 160° for four hours with p-chloraniline (25 g.). The reaction mixture was diluted with ether and the precipitated dye dissolved in ethanol. The solution was filtered and the solution evaporated to dryness. The residue was repeatedly extracted with hot ethyl acetate (to remove soluble thioketone) leaving the product as a purple powder, M. Pt. 166–168°. Incorporated in a gelatino-silver iodobromide emulsion it extended the sensitivity to 6100 Å. with a maximum at 5900 Å.

EXAMPLE 14

*3-methyl-3'-ethyl-9-benzylaminothiacarbocyanine iodide*

3 - methyl - 3'-ethyl-9-ethylthio-thiacarbocyanine iodide (5 g.) was heated at 100° with benzylamine (50 cc.) for 15 minutes; an orange solid separated during this period. The cooled suspension was diluted with ether and the insoluble dye was collected and crystallised from methanol giving small orange-red fluffy needles, M. Pt. 253–254° C. Incorporated in a gelatino-silver iodobromide emulsion the dye extended the sensitivity to 5400 Å. with a maximum at 5100 Å.

EXAMPLE 15

*3-methyl-3'-ethyl-9-cyclohexylaminothiacarbocyanine iodide*

3-methyl-3'-ethyl-9-ethylthiothiacarbocyanine iodide (5 g.) was heated at 100° for 1½ hours with cyclohexylamine (50 cc.). The orange solution was diluted with ether and the precipitated product recrystallised from ethanol from which it separated as matted yellow-orange needles, M. Pt. 220–222° C. Incorporated in a gelatino-silver iodobromide emulsion it extended the sensitivity to 5400 Å. with a maximum at 5000 Å.

EXAMPLE 16

*3-methyl-3'-ethyl-9-methylaminothiacarbocyanine iodide*

3-methyl-3'-ethyl-9-ethylthiothiacarbocyanide iodide (2.5 g.) was heated for 3 hours at 70° with a mixture of ethanol (30 cc.) and 25% aqueous methylamine (30 cc.) for 2 hours. The yellow solution was cooled at 0° C. and the solid which crystallised collected. It crystallised from methanol as small yellow needles, M. Pt. 224–226°. Incorporated in a gelatino-silver iodobromide emulsion it extended the sensitivity to 5300 Å. with an indeterminate maximum at about 5000 Å.

EXAMPLE 17

*3:5:6-trimethyl-3'-ethyl-9-(4-methylphenylamino) oxathiacarbocyanine iodide*

3:5:6 - trimethyl-3'-ethyl-9-ethylthio-oxathiacarbocyanine iodide (2.5 g.) was heated at 100° for 3 hours with p-toluidine (25 g.). The orange solution was diluted with ether and the precipitated product recrystallised from acetone when it was obtained as small orange needles, M. Pt. 216° C.

EXAMPLE 18

*3-ethyl-3'-methyl-9-(4-methylphenylamino)-thiaquino(2') carbocyanine perchlorate*

3 - ethyl - 3'-methyl-9-ethylthiothiaquino(2')-carbocyanine perchlorate (2.5 g.) was heated at 140° for 1½ hours with p-toluidine (25 g.). The purple reaction mixture was diluted with ether and the precipitated product collected.

EXAMPLE 19

*3:3'-dimethyl-11-(4-methylphenylamino)indothia-dicarbocyanine iodide*

3:3' - dimethyl - 11 - ethylthio - indothiadicarbocyanine iodide (2.5 g.) was heated at 100° for 30 minutes with p-toluidine (25 g.). The purple solution was diluted with ether and the precipitated product re-dissolved in acetone. Addition of ether to the acetone precipitated the product as small purple crystals, M. Pt. 185° C.

EXAMPLE 20

*3:3'-dimethyl-11-(4-methylphenylamino)indothia-dicarbocyanine iodide*

3:3' - dimethyl - 11 - ethylthio - indothiadicarbocyanine iodide (2.5 g.) was heated at 100° C. for 10 minutes with p-phenetidine (20 cc.). The purple reaction mixture was diluted with ether and the precipitated solid dissolved in acetone (40 cc.) from which the product was obtained by dilution with ether. It crystallised from acetone/ether as small dark brown crystals with a metallic lustre, M. Pt. 159–161° C.

What we claim is:

1. A cyanine dyestuff of the general formula:

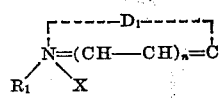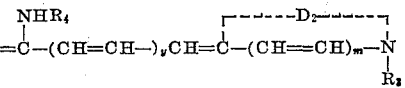

where $R_1$ and $R_3$ are selected from the class consisting of alkyl, hydroxyalkyl and aralkyl groups, $R_4$ is selected from the class consisting of alkyl, cycloalkyl, aralkyl and aryl groups, $D_1$ and $D_2$ are selected from the class consisting of residues of five-membered and six-membered heterocyclic ring systems of the type known for use in cyanine dyes, X represents an acid radicle, and $n$, $m$, $x$ and $y$ are each selected from nought and one.

2. A process for the production of cyanine dyestuffs which comprises heating a compound of the general formula:

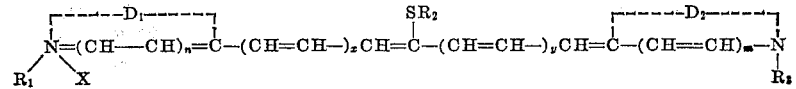

where $R_1$ and $R_3$ are selected from the group consisting of alkyl, hydroxyalkyl and aralkyl groups, $R_2$ is selected from the class consisting of alkyl, aralkyl and aryl groups, $D_1$ and $D_2$ are selected from the class consisting of residues of five-membered and six-membered heterocyclic ring systems of the type known for use in cyanine dyes, X represents an acid radical, and $n$, $m$, $x$ and $y$ are each selected from nought and one, with a primary amine of the formula $R_4NH_2$ where $R_4$ is selected from the class consisting of alkyl, cycloalkyl, aralkyl and aryl groups.

3. The dyestuff 3:3'-dimethyl-9-anilino thiacarbocyanine bromide of the structural formula:

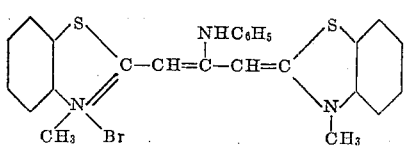

4. The dyestuff 3-methyl-3'-ethyl-9-(4-methyl-phenylamino) thiacarbocyanine iodide of the structural formula:

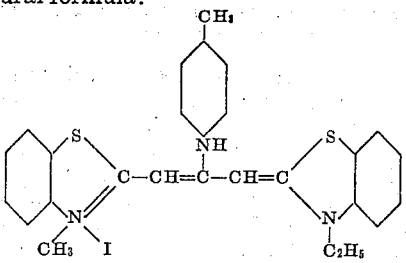

5. The dyestuff 3:3'-diethyl-9-anilino thiacarbocyanine iodide of the structural formula:

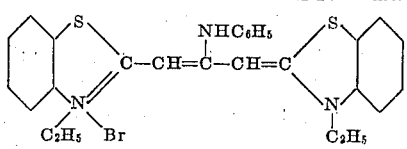

JOHN DAVID KENDALL.
DOUGLAS JAMES FRY.

No references cited.